United States Patent
Yao et al.

(10) Patent No.: US 11,622,358 B2
(45) Date of Patent: Apr. 4, 2023

(54) NETWORK NODE AND METHOD IN A WIRELESS COMMUNICATIONS NETWORK

(71) Applicant: Telefonaktiebolaget LM Ericsson (publ), Stockholm (SE)

(72) Inventors: Pu Yao, Beijing (CN); Saad Naveed Ahmed, Sundbyberg (SE)

(73) Assignee: TELEFONAKTIEBOLAGET LM ERICSSON (PUBL), Stockholm (SE)

(*) Notice: Subject to any disclaimer, the term of this patent is extended or adjusted under 35 U.S.C. 154(b) by 52 days.

(21) Appl. No.: 17/042,777

(22) PCT Filed: Mar. 29, 2018

(86) PCT No.: PCT/CN2018/081139
§ 371 (c)(1),
(2) Date: Sep. 28, 2020

(87) PCT Pub. No.: WO2019/183891
PCT Pub. Date: Oct. 3, 2019

(65) Prior Publication Data
US 2021/0022147 A1    Jan. 21, 2021

(51) Int. Cl.
*H04W 72/08* (2009.01)
*H04W 72/04* (2023.01)
*H04W 72/10* (2009.01)

(52) U.S. Cl.
CPC ..... *H04W 72/082* (2013.01); *H04W 72/0413* (2013.01); *H04W 72/10* (2013.01)

(58) Field of Classification Search
CPC ........... H04W 72/082; H04W 72/0413; H04W 72/10

(Continued)

(56) References Cited

U.S. PATENT DOCUMENTS

2012/0155416 A1* 6/2012 Zhang ............... H04W 72/04
370/329
2012/0314680 A1* 12/2012 Kela ............... H04W 72/042
370/329

(Continued)

FOREIGN PATENT DOCUMENTS

CN      103313196 A     9/2013
WO      2013169173 A1   11/2013

(Continued)

OTHER PUBLICATIONS

International Search Report and the Written Opinion of the International Searching Authority, issued in corresponding International Application No. PCT/CN2018/081139, dated Jan. 8, 2019, 7 pages.

(Continued)

*Primary Examiner* — Chi Tang P Cheng
(74) *Attorney, Agent, or Firm* — Rothwell, Figg, Ernst & Manbeck, P.C.

(57) ABSTRACT

A method performed by a network node for deciding whether or not to trigger short Semi Persistent Scheduling (SPS) reactivation of a short SPS activated User Equipment (UE) in a wireless communication network is provided.
The network node receives Uplink, UL, data from the UE over a radio resource. The radio resource comprises any one out of: an SPS resource and a dynamically granted resource. The network node determines a difference of signal quality of the radio resource used for the received UL data compared to a previous signal quality calculated when last of any one out of: deactivation and reactivation of short SPS was triggered. The network node then decides whether or not to trigger short SPS reactivation of the UE based on the determined difference of the signal quality.

22 Claims, 10 Drawing Sheets

(58) Field of Classification Search
USPC .......................................................... 370/329
See application file for complete search history.

(56) References Cited

U.S. PATENT DOCUMENTS

2014/0003489 A1    1/2014  Hannuksela
2019/0029033 A1*   1/2019  Tang ................ H04W 28/0278

FOREIGN PATENT DOCUMENTS

WO       2017166213 A1    10/2017
WO       2017196400 A1    11/2017

OTHER PUBLICATIONS

Samsung Electronics "pCR 45.820 NB M2M—Semi-Persistent Scheduling" 3GPP TSG GERAN CIoT Adhoc #3, GPC150325, Kista, Sweden, Jun. 29-Jul. 2, 2015, 11 pages.

LG Electronics Inc. "Clean-up of SPS related terminology in NR" 3GPP TSG-RAN WG2 NR Adhoc, R2-1706851, Qingdao, China, Jun. 27-29, 2017, 14 pages.

Ericsson "SPS & Multi-grant transmissions for NB-IoT" 3GPP TSG-RAN WG2 #101, R2-1803698, Athens, Greece, Feb. 26-Mar. 2, 2018, 6 pages.

* cited by examiner

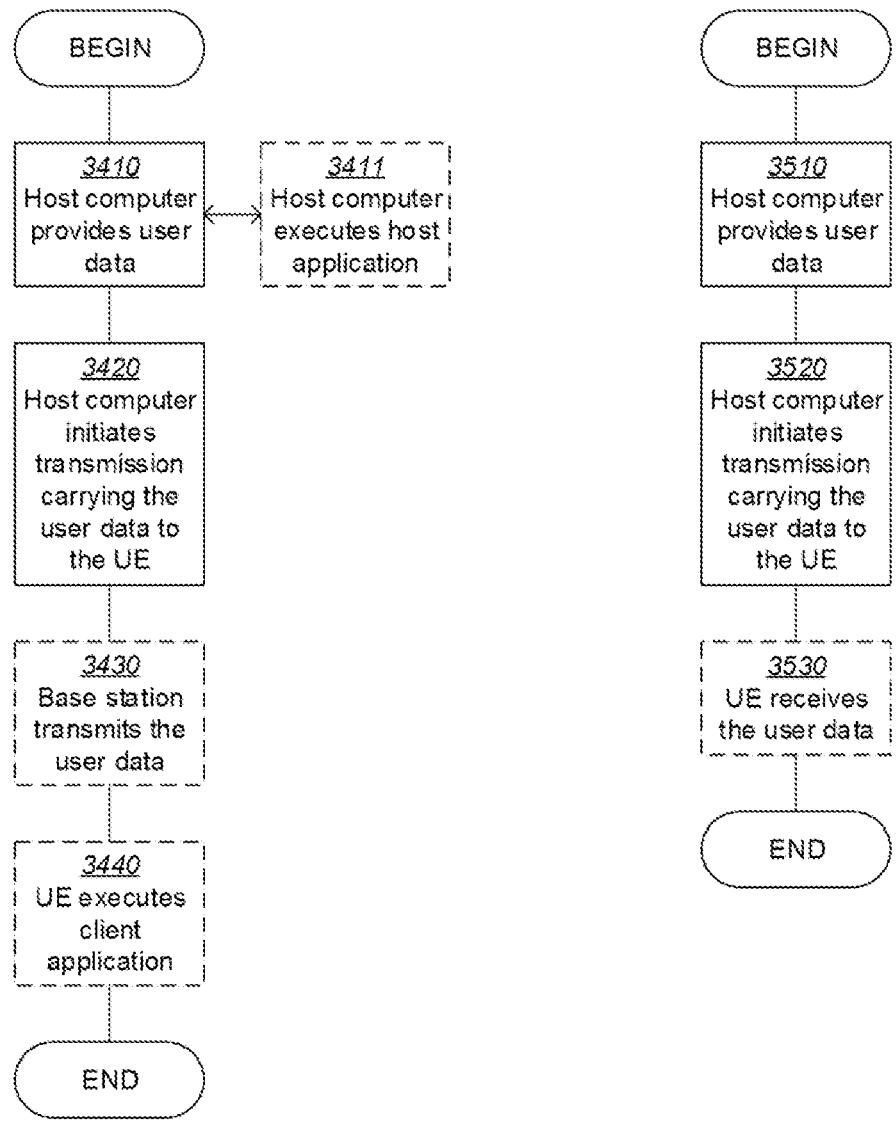

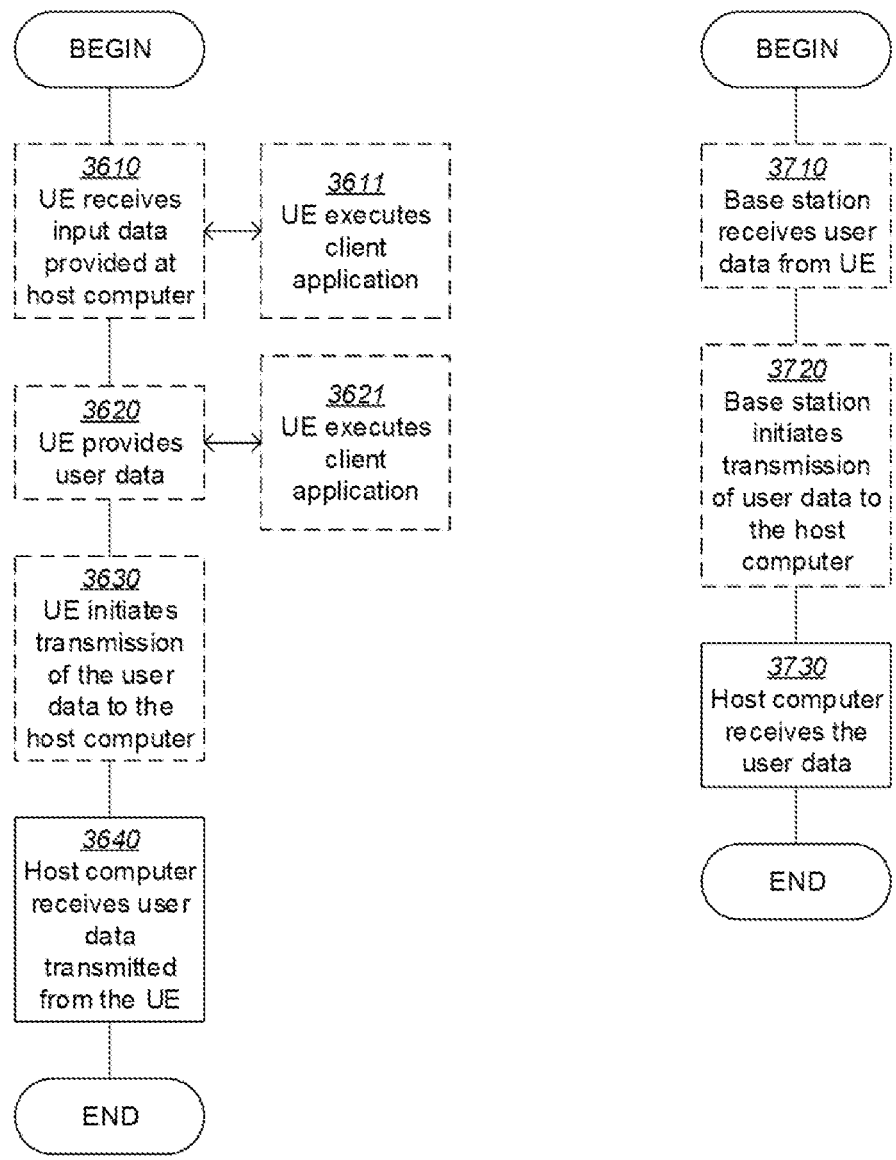

NETWORK NODE AND METHOD IN A WIRELESS COMMUNICATIONS NETWORK

TECHNICAL FIELD

Embodiments herein relate to a network node and methods therein. In particular, they relate to deciding whether or not to trigger short Semi-Persistent Scheduling (SPS) reactivation of a short SPS activated User Equipment (UE) in a wireless communication network.

BACKGROUND

In a typical wireless communication network, User Equipments (UE)s, also known as wireless communication devices, wireless devices mobile stations, stations (STA) and/or, communicate via a Local Area Network such as a WiFi network or a Radio Access Network (RAN) to one or more core networks (CN). The RAN covers a geographical area which is divided into service areas or cell areas, which may also be referred to as a beam or a beam group, with each service area or cell area being served by a network node such as a radio network node and a radio access node e.g., a Wi-Fi access point or a radio base station (RBS), which in some networks may also be denoted, for example, a NodeB, eNodeB (eNB), or gNB as denoted in 5th Generation (5G). A service area or cell area is a geographical area where radio coverage is provided by the radio network node. The radio network node communicates over an air interface operating on radio frequencies with the UE within range of the network node. The network node communicates to the UE in DownLink (DL) and from the UE in UpLink (UL).

Specifications for the Evolved Packet System (EPS), also called a Fourth Generation (4G) network, have been completed within the 3rd Generation Partnership Project (3GPP) and this work continues in the coming 3GPP releases, for example to specify a Fifth Generation (5G) network also referred to as 5G New Radio (NR). The EPS comprises the Evolved Universal Terrestrial Radio Access Network (E-UTRAN), also known as the Long Term Evolution (LTE) radio access network, and the Evolved Packet Core (EPC), also known as System Architecture Evolution (SAE) core network. E-UTRAN/LTE is a variant of a 3GPP radio access network wherein the radio network nodes are directly connected to the EPC core network rather than to RNCs used in 3rd Generation (3G) networks. In general, in E-UTRAN/LTE the functions of a 3G RNC are distributed between the radio network nodes, e.g. eNodeBs in LTE, and the core network. As such, the RAN of an EPS has an essentially "flat" architecture comprising radio network nodes connected directly to one or more core networks, i.e. they are not connected to RNCs. To compensate for that, the E-UTRAN specification defines a direct interface between the radio network nodes, this interface being denoted the X2 interface.

Multi-antenna techniques can significantly increase the data rates and reliability of a wireless communication system. The performance is in particular improved if both the transmitter and the receiver are equipped with multiple antennas, which results in a Multiple-Input Multiple-Output (MIMO) communication channel. Such systems and/or related techniques are commonly referred to as MIMO.

In addition to faster peak Internet connection speeds, 5G planning aims at higher capacity than current 4G, allowing higher number of mobile broadband users per area unit, and allowing consumption of higher or unlimited data quantities in gigabyte per month and user. This would make it feasible for a large portion of the population to stream high-definition media many hours per day with their UEs, when out of reach of Wi-Fi hotspots. 5G research and development also aims at improved support of machine to machine communication, also known as the Internet of things, aiming at lower cost, lower battery consumption and lower latency than 4G equipment.

In cellular wireless networks, such as LTE and NR standards in 3GPP, resources for UL transmissions are normally scheduled by a network node such as e.g. eNB or gNB. This may be done dynamically, i.e. the eNB schedules the UL transmission per transmission occasion which may be a Transmission Time Interval (TTI) or multiple TTIs (TTI bundling). Thus, in the case of Dynamic Scheduling, a UE may get scheduling assignment grants in every subframe. This gives the network full flexibility in assigning the resources to the UE at the cost of transmission of resource allocation information on Physical Downlink Control Channel (PDCCH) in every subframe. This also gives the flexibility of varying the resource allocation based on the reported channel conditions. For some services the packet size may be small and the inter-arrival time packets is constant, e.g. one packet every 20 ms during active period and one silence indicator at 160 ms. The control signaling overhead (PDCCH) is too much for the E-UTRAN in order to support a large number of such service users.

Semi-Persistent Scheduling (SPS)

To overcome this problem an SPS framework may be used. In an SPS framework multiple periodic occasions are granted at the same time, i.e. prior to a data transmission. This means that the resources are allocated at once and the UE may use these resources instead of allocating the resources periodically.

The network node may configure the UE with SPS at any time but, typically this is done at the time of dedicated bearer establishment for the service. Configuration of SPS includes periodicity of the grant, allocation in time and frequency and Modulation and Coding Scheme (MCS) in subsequent SPS occasions. SPS may be configured only in the UL or only in the DL or in both directions. Configuration of SPS doesn't mean that the UE can start using SPS grants and/or assignments. The network node has to explicitly activate SPS in order for the UE to use SPS grants and/or assignments. So, SPS configuration and activation are two different things, the network node first configures the UE with SPS and then activates the UE. The network node may explicitly release, also referred to as deactivate, SPS without release SPS RRC configuration.

Short SPS

SPS was enhanced in the specification of LTE Release 14 to support latency reduction of UL data transmissions. Compared to UL dynamic scheduling, SPS may do UL transmission much more quickly, since it removes the steps of sending scheduling requests at the UE and responding UL dynamic grant at network node. To further reduce latency, the periodicity is reduced to less than 10 ms, which is denoted as short SPS. In the specification, short SPS is denoted as SPS with semiPersistSchedIntervalUL shorter than sf10. The value sf10 corresponds to 10 sub-frames. Short SPS means SPS interval less than 10 ms. When short SPS is configured, skipUplinkTxSPS shall preferably be configured too. According to TS 36.321 SkipUplinkTxSPS means that, if configured, the UE skips UL transmissions for a configured uplink grant if no data is available for transmission in the UE buffer. E-UTRAN configures skipUplinkTxSPS when semiPersistSchedIntervalUL is shorter than sf10.

In pre Release-14 i.e. before short SPS and skipUplinkTxSPS introduced in specification, if the buffer is empty, the UE needs to send a padding on the allocated SPS resources to fill the empty resources. It is more likely that the UE may have empty data and such a short SPS interval means more transmission with padding, and sending padding at every TTI introduces many un-necessary interferences. This is since sending uplink signals will interference neighbor cells, this makes it worse since the signals sent are useless paddings. Consequently, the option of skipping UL data transmissions when the buffer is empty is introduced. However, the configured resources are still reserved for the UE, and that may lead to inefficient resource utilization.

SUMMARY

An object of embodiments herein is to improve the efficiency of resource utilization in a wireless communications network.

According to a first aspect of embodiments herein, the object is achieved by a method performed by a network node for deciding whether or not to trigger short Semi-Persistent Scheduling, SPS, reactivation of a short SPS activated User Equipment, UE, in a wireless communication network.

The network node receives Uplink, UL, data from the UE over a radio resource. The radio resource comprises any one out of: an SPS resource and a dynamically granted resource. The network node determines a difference of signal quality of the radio resource used for the received UL data compared to a previous signal quality calculated when last of any one out of: deactivation and reactivation of short SPS was triggered. The network node then decides whether or not to trigger short SPS reactivation of the UE based on the determined difference of the signal quality.

According to a second aspect of embodiments herein, the object is achieved by a network node for deciding whether or not to trigger short Semi-Persistent Scheduling, SPS, reactivation of a short SPS activated User Equipment, UE, 120 in a wireless communication network. The network node 110 is configured to:

Receive Uplink, UL, data from the UE 120, over a radio resource, which radio resource is adapted to comprise any one out of: an SPS resource and a dynamically granted resource, determine a difference of signal quality of the radio resource used for the received UL data compared to a previous signal quality calculated when last of any one out of: deactivation and reactivation of short SPS was triggered, and decide whether or not to trigger short SPS reactivation of the UE 120 based on the determined difference of the signal quality.

By basing a decision to whether or not a reactivation of short SPS shall be triggered, unnecessary reactivations of short SPS activated UEs, demanding considerable resources are avoided. This in turn results in an improved efficiency of resource utilization in the wireless communications network.

An advantage of embodiments herein is that the methods provided by embodiments herein determine when and how to reactivate a short SPS activated UE, to reach a balance between resource cost, e.g. PDCCH cost and channel condition adapting.

A further advantage of embodiments herein is that they provide a criterion to deactivate short SPS when the delay reducing gain is low with allocated SPS resources.

BRIEF DESCRIPTION OF THE DRAWINGS

Examples of embodiments herein are described in more detail with reference to attached drawings in which:

FIGS. 8 to 11 are flowcharts illustrating methods implemented in a communication system including a host computer, a base station and a user equipment.

DETAILED DESCRIPTION

As a part of developing embodiments herein the inventors have identified a problem which first will be discussed.

With dynamic scheduling, a Transmission Format (TF) is selected at each scheduling occasion so that radio condition can be followed timely, while for SPS, to save PDCCH resources and reduce interference on control symbols, UL grant for SPS also referred to as SPS reactivation, should not be sent very often after SPS has been activated. However, the TF still need to be adjusted if radio condition changed and the TF is not adequate any longer.

Here TF may refer to MCS, Transmission Block Size (TBS), and Physical Resource such as time and frequency, Blocks (PRB) used for one transmission.

Some criteria need to be set to decide when to reactivate a short SPS UE.

According to embodiments herein a method for reactivating short SPS for a short SPS activated UE is provided.

Figure 1:
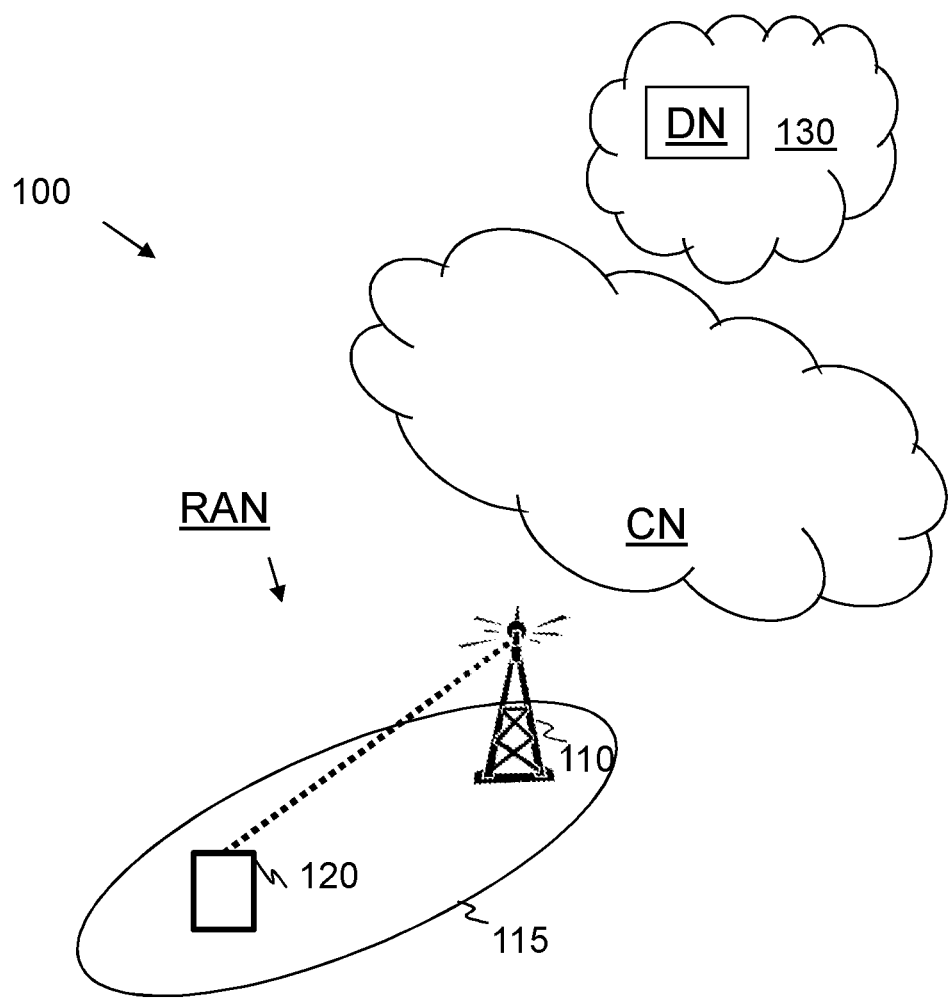
FIG. 1 is a schematic block diagram illustrating embodiments of a wireless communications network.

FIG. 1 is a schematic overview depicting a wireless communications network 100 wherein embodiments herein may be implemented. The wireless communications network 100 comprises one or more RANs and one or more CNs. The wireless communications network 100 may use 5G NR but may further use a number of other different technologies, such as, Wi-Fi, (LTE), LTE-Advanced, Wideband Code Division Multiple Access (WCDMA), Global System for Mobile communications/enhanced Data rate for GSM Evolution (GSM/EDGE), Worldwide Interoperability for Microwave Access (WiMax), or Ultra Mobile Broadband (UMB), just to mention a few possible implementations.

Network nodes operate in the wireless communications network 100, such as a network node 110 providing radio coverage by means of antenna beams, referred to as beams herein. The network node 110 provides radio coverage over a geographical area by means of antenna beams. The geographical area may be referred to as a cell 115, a service area, beam or a group of beams. The network node 110 may be a transmission and reception point e.g. a radio access network node such as a base station, e.g. a radio base station such as a NodeB, an evolved Node B (eNB, eNode B), an NR Node B (gNB), a base transceiver station, a radio remote unit, an Access Point Base Station, a base station router, a transmission arrangement of a radio base station, a stand-alone access point, a Wireless Local Area Network (WLAN) access point, an Access Point Station (AP STA), an access controller, a UE acting as an access point or a peer in a Device to Device (D2D) communication, or any other network unit capable of communicating with a UE within the cell 115 served by the network node 110 depending e.g. on the radio access technology and terminology used.

UEs operate in the wireless communication network 100 e.g. a UE 120. The UE 120 may be a mobile station, a non-access point (non-AP) STA, a STA, a wireless terminal, an NR device, which communicate via one or more Access Networks (AN), e.g. RAN, to one or more core networks (CN). It should be understood by the skilled in the art that "wireless device" is a non-limiting term which means any terminal, wireless communication terminal, user equipment, Machine Type Communication (MTC) device, Device to Device (D2D) terminal, or node e.g. smart phone, laptop, mobile phone, sensor, relay, mobile tablets or even a small base station communicating within a cell.

The methods according to embodiments herein are performed by the network node 110. As an alternative, a Distributed Node (DN) and functionality, e.g. comprised in a cloud 130 as shown in FIG. 2 may be used for performing or partly performing the methods.

Examples herein provide a way to determine when and how to reactivate a short SPS activated UE 120, to reach a balance between PDCCH cost and channel condition adapting.

Reactivation short SPS here means that the UE 120 has been configured with a UL SPS grant with short interval meaning that the UE 120 is short SPS activated, and a new short SPS grant is sent to the UE 120 to replace the old one.

According to some embodiments herein it is possible to select which UE should have short SPS in order to utilize resources in the best way and target low latency use case to utilize resources efficiently. The UEs may be selected because they are the UEs that best benefit from short SPS. Other UEs have too bad signal quality such as SINR to be able to benefit from short SPS.

Embodiments herein provide to not use short SPS for UEs whose channel cannot support X bytes in Y time.

Figure 2A:
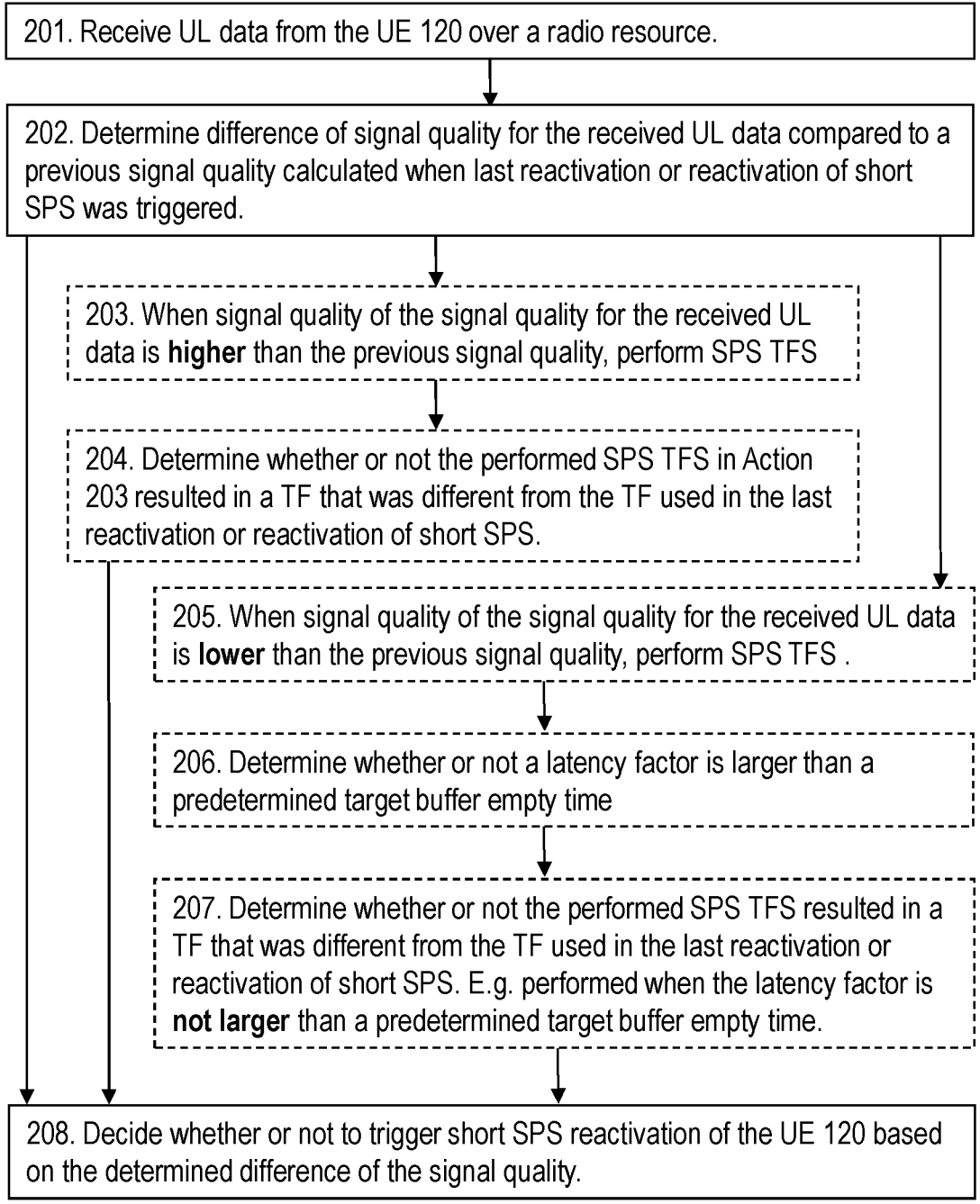
FIGS. 2a and b are a flowcharts depicting embodiments of a method in a network node.
Figure 2B:
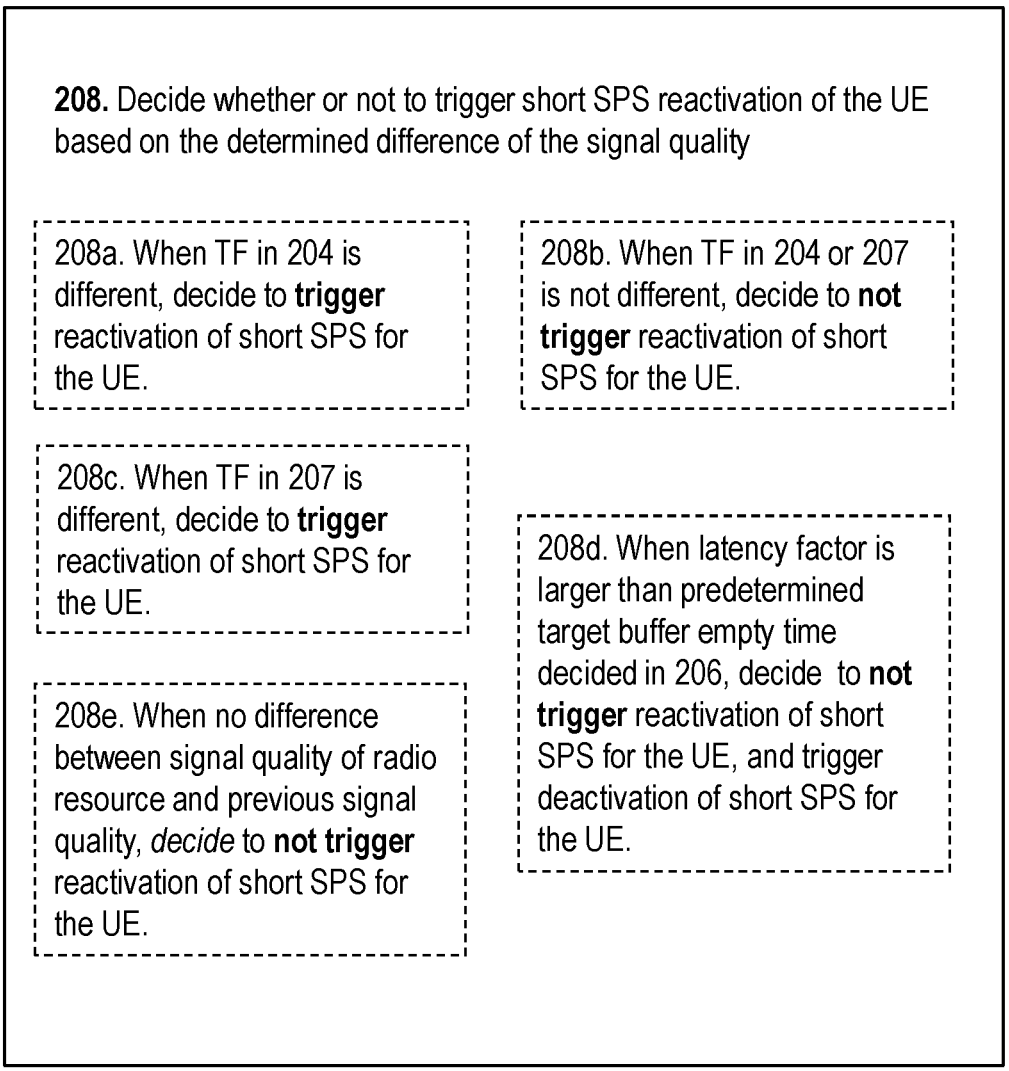

Example embodiments of a method performed by a network node 110 for deciding whether or not to trigger short SPS reactivation of the short SPS activated UE 120 in a wireless communication network 100 will now be described with reference to a flowchart depicted in FIG. 2a and FIG. 2b. The Actions 201-208 are shown in FIG. 2a and the actions 208a, 208b, 208c and 208d are shown in FIG. 2b.

The method comprises the following actions, which actions may be taken in any suitable order. Actions that are optional are presented in dashed boxes in FIGS. 2a and b.

Action 201

According to an example scenario, the UE 120 is configured with short SPS and is short SPS activated or reactivated. The network node 110 receives UL data from the UE 120, over a radio resource. The radio resource comprises any one out of: an SPS resource and a dynamically granted resource.

The wording radio resource when used herein may mean a time and/or frequency resource.

Action 202

According to embodiments herein, a decision on whether or not to trigger short SPS reactivation of the UE 120 in Action 208 below, will be based on the difference of the signal quality of the received UL data and the signal quality last time activating or reactivating SPS for the UE 120. This is to avoid unnecessary SPS reactivation and following signalling. The decision may result in no difference in signal quality and then no reactivation is needed. When there is a difference in signal quality which may be higher or lower signal quality for the received data, then it may depend on some more criteria as will be described below, to decide whether or not to reactivate SPS for the UE 120. The network node 110 therefore determines a difference of signal quality of the radio resource used for the received UL data compared to a previous signal quality calculated when last of any one out of: deactivation and reactivation of short SPS was triggered.

The signal quality may e.g. be SINR, Receiving power, interference and noise power, decoding results, UE reported power headroom.

There are respective different example scenarios, each with some respective embodiments.

In the first example scenario related to the first embodiments, the determined difference of signal quality comprises that the signal quality of the radio resource used for the received UL data is higher than the previous signal quality calculated when last of any one out of: deactivation and reactivation of short SPS was triggered.

In the second example scenario related to the second embodiments, the determined difference of signal quality comprises that the signal quality of the radio resource used for the received UL data is lower than the previous signal quality calculated when last of any one out of: deactivation and reactivation of short SPS was triggered.

In the third example scenario related to the third embodiments, the determined difference of signal quality comprises that there is no difference between the signal quality of the radio resource used for the received UL data and the previous signal quality calculated when last of any one out of: deactivation and reactivation of short SPS was triggered.

Action 203

According to some first embodiments related to a first example scenario, the determined difference of signal quality comprises that the signal quality of the radio resource used for the received UL data is higher than the previous signal quality calculated when last of any one out of: deactivation and reactivation of short SPS was triggered. In this case, the network node 110 performs an SPS Transmission Format Selection (TFS). The SPS TFS is performed when the signal quality used for the received UL data is higher to check whether the selected TF is different from the TF used in the last of deactivation or reactivation of short SPS, see Action 204 below. SPS TFS is a function which may take e.g. signal quality such as Signal to Interference and Noise Ratio (SINR), and required TBS as input, and output MCS, PRB and TBS. It may be implemented with different algorithms for different vendors.

In some embodiments, the SPS TFS may performed when further, a time period between the UL data was received and the last of any one out of: deactivation and reactivation of short SPS was triggered, is longer than a threshold. The threshold may be a hysteresis predefined in the network node 110 to avoid oversensitivity. The threshold may e.g. be in order of 100 ms.

Action 204

According to the first embodiments related to the first example scenario, the network node 110 may then determine whether or not the performed SPS TFS in the Action 203 above resulted in a TF that was different from the TF used in the last of any one out of: deactivation and reactivation of short SPS. This an advantageous criteria to determine since if the TF is not different, a reactivation of short SPS of the UE 120 will not be necessary. The determination will be used as a further criteria to decide whether or not to reactivate the short SPS in the UE 120 in the actions 208*a* and 208*b* described below.

Action 205

According to some second embodiments related to a second example scenario, the determined difference of signal quality comprises that the signal quality of the radio resource used for the received UL data is lower than the previous signal quality calculated when last of any one out of: deactivation and reactivation of short SPS was triggered. In these embodiments, the network node 110 also performs a SPS TFS in a similar way as described above. The SPS TFS is also performed when the signal quality used for the received UL data is lower to check whether the selected TF is different from the TF used in the last of deactivation or reactivation of short SPS, see Action 207 below.

Action 206

According to the second embodiments related to the second example scenario, the determined difference of signal quality comprises that the signal quality of the radio resource used for the received UL data is lower than the previous signal quality calculated when last of any one out of: deactivation and reactivation of short SPS was triggered.

In some of these embodiments, the network node 110 determines whether or not a latency factor is larger than a predetermined gain factor such as e.g. a target buffer empty time. The latency factor comprises the time to empty a target buffer with the SPS resource using the result of the performed SPS TFS. E.g. the Latency factor is represented by the number of subframes needed to transmit required TBS. This may be determined since, if with an allocated SPS resource, the UE 120 need more time to empty the target buffer than dynamic scheduling, there is no gain on latency. SPS should then preferably be deactivated.

Action 207

In some of the second embodiments, the network node 110 may determine whether or not the performed SPS TFS resulted in a TF that was different from the TF used in the last of any one out of: deactivation and reactivation of short SPS. In some of the second embodiments, this is only performed when the latency factor is not larger than a predetermined gain factor such as e.g. a target buffer empty time. The determination will be used as a further criteria to decide whether or not to reactivate the short SPS in the UE 120 in the actions 208*c* and 208*b* described below.

Action 208

The network node 110 then decides whether or not to trigger short SPS reactivation of the UE 120 based on the determined difference of the signal quality. This is to avoid unnecessary SPS reactivation of the UE 120 and following signalling, when reactivation is not needed. It is not needed if there is no difference in signal quality.

According to some third embodiments related to a third example scenario there is no difference of the signal quality and a reactivation of the STS in the UE 120 is not required. Thus in these third embodiments, the network node 110 decides to not trigger short SPS reactivation of the UE 120 when there is no difference of the signal quality.

In some of the first embodiments related to the first example scenario according to Action 204 above wherein the signal quality of the radio resource used for the received UL data is higher than the previous signal quality, the network node 110 has determined whether or not the performed SPS TFS resulted in a TF that was different from the TF used in the last of any one out of: deactivation and reactivation of short SPS. When the TF is different, a reactivation of short SPS in the UE 120 will be needed.

So, in these first embodiments, the network node 110 may, when the TF in 204 is different, decide 208*a* to trigger reactivation of short SPS for the UE 120. This may in some of these embodiments comprise deciding to trigger reactivation of short SPS for the UE 120 with low priority. Low priority comprises deciding to send the SPS reactivation to the UE 120 only when there are spare control channel resources available.

In these first embodiments, the network node 110 may, when the TF in 204 is not different, i.e. the same TF is used, decide 208*b* to not trigger reactivation of short SPS for the UE 120.

In the second embodiments related to the second example scenario above wherein the signal quality of the radio resource used for the received UL data is lower than the previous signal quality.

In some of these second embodiments, wherein, when the latency factor is not larger than a predetermined gain factor such as e.g. a target buffer empty time decided in Action 206, the network node 110 has determined in Action 207 whether or not the SPS TFS performed in Action 206 resulted in a TF that was different from the TF used in the last of any one out of: deactivation and reactivation of short SPS. As mentioned above, a reactivation of short SPS in the UE 120 will be needed when the TF is different.

In these second embodiments, the network node 110 may, when the TF in Action 207 is different, decide 208*c* to trigger reactivation of short SPS for the UE 120. This may in some of these embodiments comprise deciding to trigger reactivation of short SPS for the UE 120 with high priority. The high priority comprises deciding to send a control channel grant for the SPS reactivation to the UE 120 as soon as possible.

In these second embodiments, the network node 110 may, when the TF in Action 207 is not different, decide 208*b* to not trigger reactivation of short SPS for the UE 120.

In some of these second embodiments, when the latency factor is larger than the predetermined gain factor such as e.g. a target buffer empty time, the network node 110 may decide 208*d* to not trigger reactivation of short SPS for the UE 120, but to trigger deactivation of short SPS for the UE 120. When the latency factor is larger the UE 120 need more time to empty the target buffer than dynamic scheduling, so there is no gain on latency. Short SPS should then preferably be deactivated.

Figure 3:
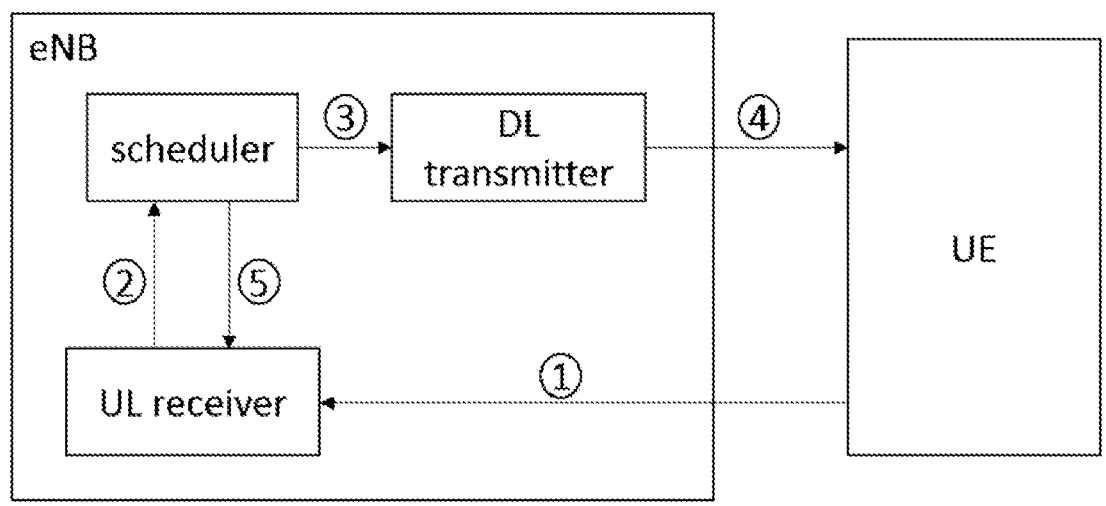
FIG. 3 is a schematic block diagram illustrating embodiments of a network node.

An example is illustrated in FIG. 3 showing an example implementation in the network node 110 to adopt embodiments herein. The network node 110 is denoted eNB and the network node 120 is denoted UE in FIG. 3. A pre-condition is that the UE 120 is configured with a UL SPS grant of short interval, i.e. the UE 120 is short SPS activated or reactivated. The actions are marked with a figure in a circle in FIG. 3.

In Action 1, UE 120 transmits uplink data over the SPS resource or dynamically granted resource.

In Action 2, an UL receiver in the network node 110 decodes uplink data and reports decoding results, measurement info such as e.g. SINR, receiving power, etc., and other information such as e.g. Buffer Status Report (BSR), Power Headroom Report (PHR), etc. to a scheduler in the network node 110.

In Action 3, a scheduler in the network node 110 decides whether reactivation is needed for short SPS. If the scheduler decides to reactivate or deactivate SPS, it allocates PDCCH resource and indicate DL transmitter to send the grant.

In Action 4, a DL transmitter in the network node 110 sends the reactivation or deactivation grant over PDCCH.

In Action 5, the scheduler indicates UL receiver with new SPS grant for detection.

Figure 4:
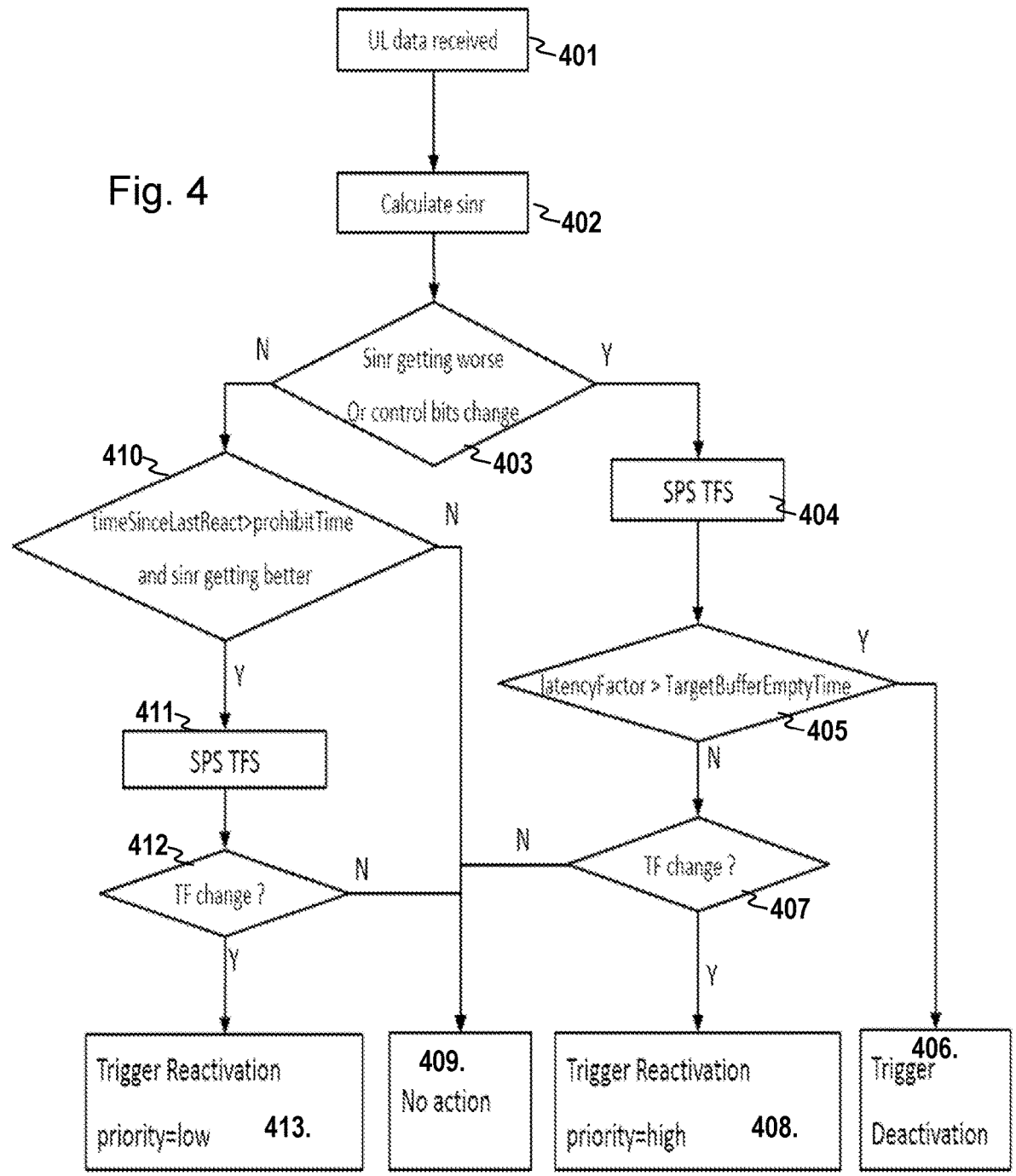
FIG. 4 is a flowchart depicting embodiments of a method in a network node.

FIG. 4 shows an example of a detailed flow of an embodiment of the method for short SPS reactivation. In this example the signal quality is represented by SINR, Y represents Yes and N represents No.

When the network node 110, e.g. its UL receiver, in detects 401 an UL transmission on SPS resource or dynamically granted resource, in the network node 110, e.g. by means of its scheduler, calculates 402 a new SINR according to measurements performed on the received UL transmission to compare with the previous SINR. The scheduler in the network node 110 decodes results and other related info reported from the UL receiver. The network node 110 then determines 403 the whether the SINR is getting worse or whether the control bits changes. This is related to Action 201 and 202 described above.

The following relates to the second embodiments described above:
  If the network node 110, e.g. by means of its scheduler, finds that the SINR is getting worse, or the control bits that might multiplex on PUSCH changed, it performs 404 a SPS TFS, i.e. transmission format selection immediately to select a new TF. The TF may comprise MSC, PRB and TBS. This is related to Action 205 described above.
  The SINR getting worse may be represented by previousSinr-sinr>hyst, previousSinr is the SINR calculated when last reactivation triggered. Hyst means hysteresis which is a threshold defined in the network node 110 to avoid oversensitivity.
  SPS TFS is a function which take SINR, required TBS as input, and output is a selected TF such as MCS, PRB and TBS. It may be implemented with different algorithms for different vendors.

Target buffer size is the data size the network node 110 expects to be carried by the SPS resource, it may be a predefined value, or an estimated value in the network node 110.

The network node then evaluates 405 if there is enough latency gain provided with the previous SINR by calculating a latency Factor. This is performed by multiplying a target buffer size with SPS interval and then divide it with the TBS. This is related to Action 206 described above.

Latency gain when used herein means transmit data with target buffer size faster than short SPS is deactivated.

A latency factor may be represented by number of subframes needed to transmit required TBS.

A target buffer size is the data size the network node 110 expects to transmit with short SPS resource and with low latency, it may be a predefined value, or an estimated value in the network node 110.

An SPS interval is the time period between 2 adjacent SPS transmissions.

An example of a Gain Factor is a Target Buffer Empty Time. Larger or smaller values around the Target Buffer Empty Time may be used, the Gain Factor also comprises these values.

A Target Buffer Empty Time may be predefined value in network node 110 and means the time needed to transmit data with target buffer size.

$$latencyFactor = \frac{targetBufferSize * spsInterval}{tbs}$$

If latencyFactor >Gain Factor such as e.g. a TargetBufferEmptyTime, the network node 110 decides that SPS cannot bring latency gain anymore, and triggers short SPS deactivation 406. This is related to Action 208d described above.

If latencyFactor <=Gain Factor such as e.g. a TargetBufferEmptyTime, and TF changed 407 (new TF is different with current TF, such as different mcs or PRB size is selected), trigger of short SPS reactivation with high priority 408. High priority means scheduler will send the PDCCH grant soon. This is related to Action 207 and 208c described above.

Otherwise do nothing 409. This is related to Action 209 described above.

The following relates to the first embodiments described above:

If the network node 110 e.g. by means of its scheduler finds the SINR is getting better 403, reactivation of short SPS will be triggered, with a best effort manner, e.g. with lower priority than grant for normal traffic. To avoid frequent reactivation, a hysteresis such as a prohibitTime may bedefined. If time since last reactivation (or activation) of short SPS is less than prohibit time 410, reactivation will not be triggered 409. This is related to Action 208b described above A prohibit Time is a time threshold, if time since last (re)activation larger than the prohibit Time, then perform TFS and following action, to avoid frequent reactivation.

SINR getting better may be represented by inr—previousSinr >hyst, previousSinr is the SINR calculated when last reactivation was triggered. Hyst means hysteresis and is a threshold defined e.g. in the network node 110 to avoid oversensitivity.

If SINR is getting better 403 and timeSinceLastReativation >prohibitTime, SPS TFS is performed 411. If TF is changed 412, the network node 110 triggers reactivation of short SPS with low priority 413. This is related to Action 203, 204 and 208a described above.

Low priority means that the network node 110, e.g. by means of its scheduler, only considers to send the reactivation of short SPS when there is spare channel resource such as e.g. PDCCH resource. Which implies that the reactivation of short SPS may be delayed or ignored.

Figure 5A:
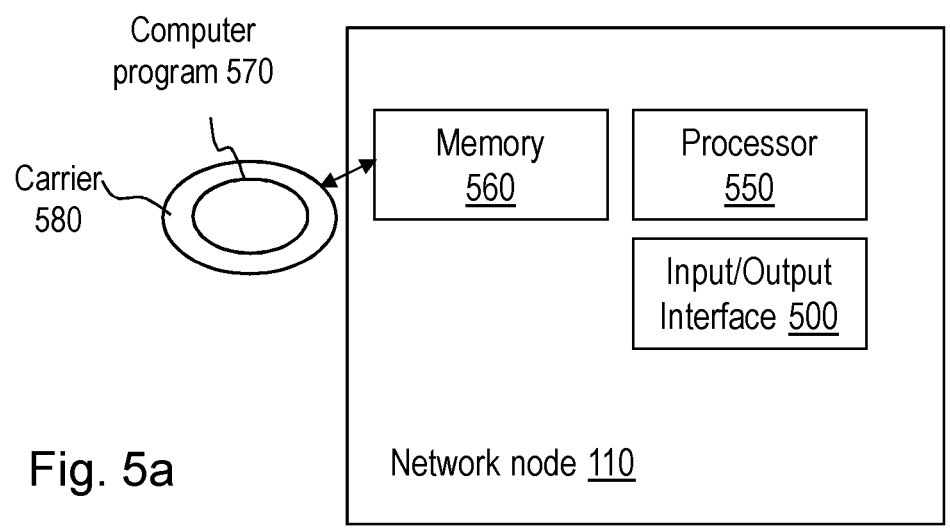
FIGS. 5A and 5B are schematic block diagrams illustrating embodiments of a network node.
Figure 5B:
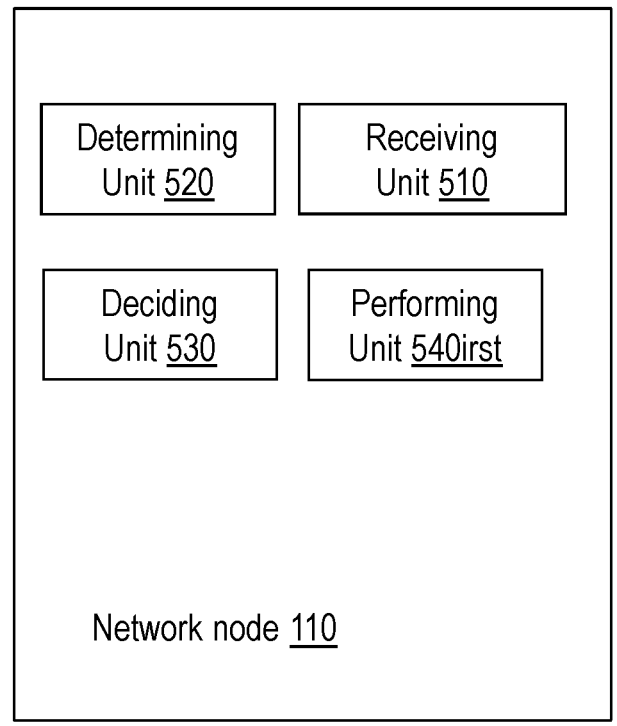

To perform the method actions above for deciding whether or not to trigger short SPS reactivation of a short SPS activated UE 120 in a wireless communication network, the network node 110 may comprise the arrangement depicted in FIGS. 5a and 5b.

The network node 110 may comprise an input and output interface 500 configured to communicate e.g. with the UE 120. The input and output interface 500 may comprise a wireless receiver (not shown) and a wireless transmitter (not shown).

The network node 110 is configured to, e.g. by means of a receiving unit 510 in the network node 110, receive UL data from the UE 120 over a radio resource. The radio resource is adapted to comprise any one out of: an SPS resource and a dynamically granted resource.

The network node 110 is further configured to, e.g. by means of a determining unit 520 in the network node 110, determine a difference of signal quality of the radio resource used for the received UL data compared to a previous signal quality calculated when last of any one out of: deactivation and reactivation of short SPS was triggered.

The network node 110 is further configured to, e.g. by means of a deciding unit 530 in the network node 110, decide whether or not to trigger short SPS reactivation of the UE 120 based on the determined difference of the signal quality.

The network node 110 may in some embodiments be further configured to, e.g. by means of a performing unit 540 in the network node 110 when the signal quality of the radio resource used for the received UL data is lower than the previous signal quality calculated when last of any one out of: deactivation and reactivation of short SPS was triggered, perform a SPS TFS.

The network node 110 may in some of these embodiments further be configured to, e.g. by means of the determining unit 520 in the network node 110, determine whether or not a latency factor is larger than a predetermined Gain Factor such as e.g. a Target Buffer Empty Time. The latency factor may be adapted to comprise the time to empty a target buffer with the SPS resource using the result of the performed SPS TFS.

The network node 110 may in some of these embodiments further be configured to, e.g. by means of the determining unit 520 in the network node 110, when the latency factor is not larger than a predetermined Gain Factor such as e.g. a Target Buffer Empty Time, determine whether or not the performed SPS TFS resulted in a TF that was different from the TF used in the last of any one out of: deactivation and reactivation of short SPS.

The network node 110 may in some of these embodiments further be configured to, e.g. by means of the deciding unit 530 in the network node 110, decide to trigger reactivation of short SPS for the UE 120, when the TF is different, and decide to not trigger reactivation of short SPS for the UE 120 when the TF is not different.

The network node 110 may in some of these embodiments further be configured to, e.g. by means of the deciding unit 530 in the network node 110, decide to trigger reactivation of short SPS for the UE 120, by deciding to trigger reactivation of short SPS for the UE 120 with high priority. The high priority is adapted to comprise deciding to send a control channel grant for the SPS reactivation to the UE 120 as soon as possible The network node 110 may in some of these embodiments further be configured to, e.g. by means of the deciding unit 530 in the network node 110, decide to not trigger reactivation of short SPS for the UE 120 when the latency factor is larger than the predetermined Gain Factor such as e.g. a Target Buffer Empty Time, and trigger deactivation of short SPS for the UE 120.

The network node 110 may in some embodiments be further configured to, e.g. by means of a performing unit 540 in the network node 110 perform a SPS TFS when the signal quality of the radio resource used for the received UL data is higher than the previous signal quality calculated when last of any one out of: deactivation and reactivation of short SPS was triggered. The network node 110 may in some of these embodiments further be configured to, e.g. by means of the performing unit 540 in the network node 110, perform the SPS TFS when further, a time period between the UL data was received and the last of any one out of: deactivation and reactivation of short SPS was triggered, is longer than a threshold.

The network node 110 may in some embodiments further be configured to, e.g. by means of the determining unit 520 in the network node 110, determine whether or not the performed SPS TFS resulted in a TF that was different from the TF used in the last of any one out of: deactivation and reactivation of short SPS.

The network node 110 may further be configured to, e.g. by means of the deciding unit 530 in the network node 110 decide to trigger reactivation of short SPS for the UE 120 when the TF is different, and decide to not trigger reactivation of short SPS for the UE 120 when the TF is not different.

The network node 110 may in some of these embodiments further be configured to, e.g. by means of the deciding unit 530 in the network node 110, decide to trigger reactivation of short SPS for the UE 120 by deciding to trigger reactivation of short SPS for the UE 120 with low priority. The low priority is adapted to comprise deciding to send the SPS reactivation to the UE 120 only when there are spare control channel resources available.

The network node 110 may in some embodiments further be configured to, e.g. by means of the deciding unit 530 in the network node 110, decide to not trigger reactivation of short SPS for the UE 120 when there is no difference between the signal quality of the radio resource used for the received UL data and the previous signal quality calculated when last of any one out of: deactivation and reactivation of short SPS was triggered.

The embodiments herein may be implemented through a respective processor or one or more processors, such as a processor 550 of a processing circuitry in the network node 110 depicted in FIG. 5a, together with a respective computer program code for performing the functions and actions of the embodiments herein. The program code mentioned above may also be provided as a computer program product, for instance in the form of a data carrier carrying computer program code for performing the embodiments herein when being loaded into the network node 110. One such carrier may be in the form of a CD ROM disc. It is however feasible with other data carriers such as a memory stick. The computer program code may furthermore be provided as pure program code on a server and downloaded to the network node 110.

The network node 110 may further comprise a memory 560 comprising one or more memory units. The memory comprises instructions executable by the processor 550. The memory 560 is arranged to be used to store e.g. UL data, short SPS configurations, signal quality, target buffer empty times, gain factors, latency factors, predetermined gain factors, predetermined target buffer empty times, TFs, thresholds, and applications to perform the methods herein when being executed in the network node 110.

Those skilled in the art will also appreciate that the units in the network node 110 mentioned above may refer to a combination of analog and digital circuits, and/or one or more processors configured with software and/or firmware, e.g. stored in the network node 110 that when executed by the respective one or more processors such as the processors described above. One or more of these processors, as well as the other digital hardware, may be included in a single Application-Specific Integrated Circuitry (ASIC), or several processors and various digital hardware may be distributed among several separate components, whether individually packaged or assembled into a system-on-a-chip (SoC).

In some embodiments, a computer program 570 comprises instructions, which when executed by the respective at least one processor 550, cause the at least one processor 550 of the network node 110 to perform the actions above.

In some embodiments, a carrier 580 comprises the computer program 570, wherein the carrier 580 is one of an electronic signal, an optical signal, an electromagnetic signal, a magnetic signal, an electric signal, a radio signal, a microwave signal, or a computer-readable storage medium.

Further Extensions and Variations

Figure 6:
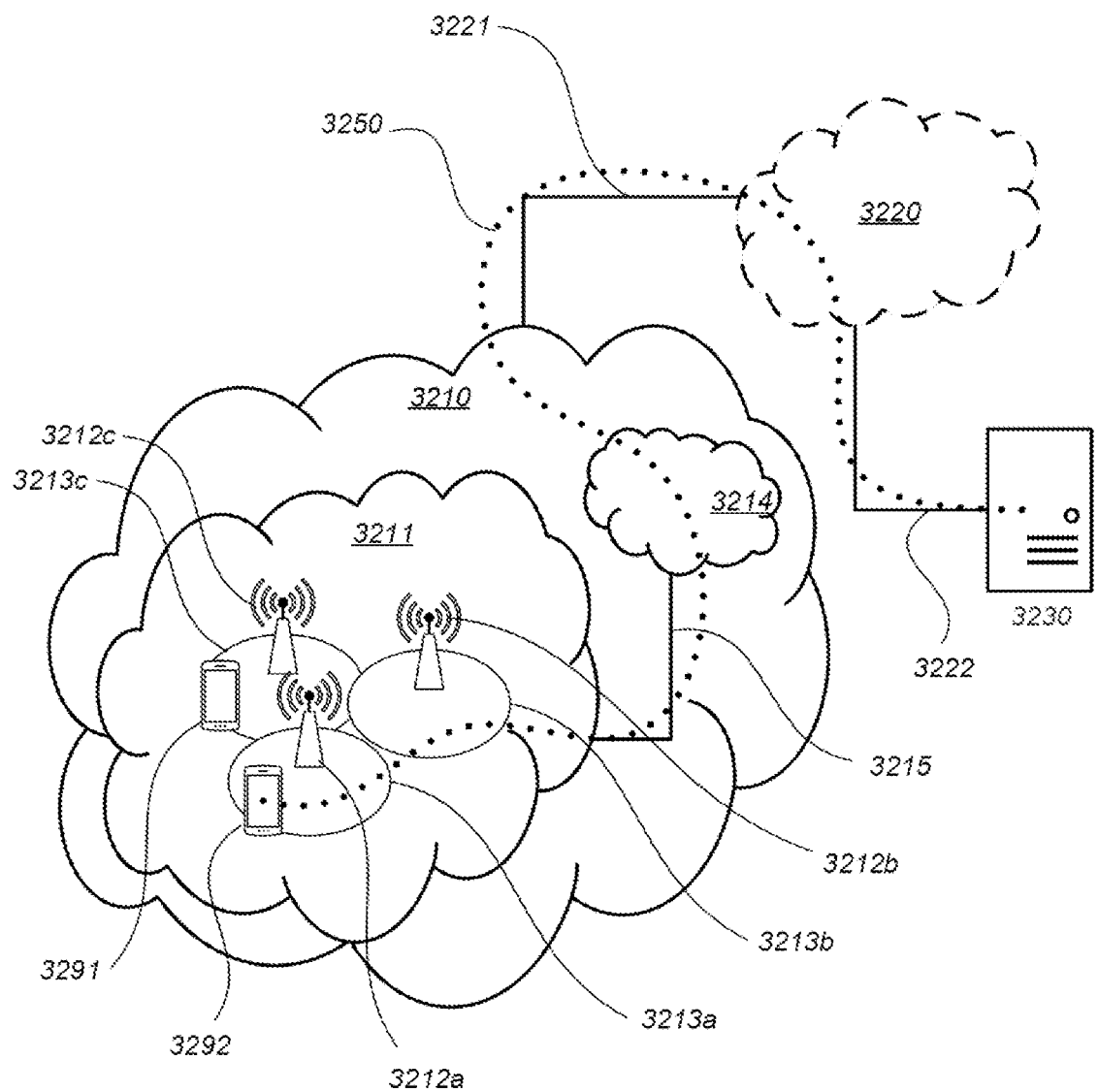
FIG. 6 schematically illustrates a telecommunication network connected via an intermediate network to a host computer.

With reference to FIG. 6, in accordance with an embodiment, a communication system includes a telecommunication network 3210 such as the wireless communications network 100, e.g. a NR network, such as a 3GPP-type cellular network, which comprises an access network 3211, such as a radio access network, and a core network 3214. The access network 3211 comprises a plurality of base stations 3212a, 3212b, 3212c, such as the first or second radio node 110, 120, access nodes, AP STAs NBs, eNBs, gNBs or other types of wireless access points, each defining a corresponding coverage area 3213a, 3213b, 3213c. Each base station 3212a, 3212b, 3212c is connectable to the core network 3214 over a wired or wireless connection 3215. A first user equipment (UE) e.g. the UE 120 such as a Non-AP STA 3291 located in coverage area 3213c is configured to wirelessly connect to, or be paged by, the corresponding base station 3212c. A second UE 3292 e.g. the first or second radio node 110, 120 or such as a Non-AP STA in coverage area 3213a is wirelessly connectable to the corresponding base station 3212a. While a plurality of UEs 3291, 3292 are illustrated in this example, the disclosed embodiments are equally applicable to a situation where a sole UE is in the coverage area or where a sole UE is connecting to the corresponding base station 3212.

The telecommunication network 3210 is itself connected to a host computer 3230, which may be embodied in the hardware and/or software of a standalone server, a cloud-implemented server, a distributed server or as processing resources in a server farm. The host computer 3230 may be under the ownership or control of a service provider, or may be operated by the service provider or on behalf of the service provider. The connections 3221, 3222 between the telecommunication network 3210 and the host computer 3230 may extend directly from the core network 3214 to the host computer 3230 or may go via an optional intermediate network 3220. The intermediate network 3220 may be one of, or a combination of more than one of, a public, private or hosted network; the intermediate network 3220, if any, may be a backbone network or the Internet; in particular, the intermediate network 3220 may comprise two or more sub-networks (not shown).

The communication system of FIG. 6 as a whole enables connectivity between one of the connected UEs 3291, 3292 and the host computer 3230. The connectivity may be described as an over-the-top (OTT) connection 3250. The host computer 3230 and the connected UEs 3291, 3292 are configured to communicate data and/or signaling via the OTT connection 3250, using the access network 3211, the core network 3214, any intermediate network 3220 and possible further infrastructure (not shown) as intermediaries. The OTT connection 3250 may be transparent in the sense that the participating communication devices through which the OTT connection 3250 passes are unaware of routing of uplink and downlink communications. For example, a base station 3212 may not or need not be informed about the past routing of an incoming downlink communication with data originating from a host computer 3230 to be forwarded (e.g., handed over) to a connected UE 3291. Similarly, the base station 3212 need not be aware of the future routing of an outgoing uplink communication originating from the UE 3291 towards the host computer 3230.

Example implementations, in accordance with an embodiment, of the UE, base station and host computer discussed in the preceding paragraphs will now be described with reference to FIG. 7. In a communication system 3300, a host computer 3310 comprises hardware 3315 including a communication interface 3316 configured to set up and maintain a wired or wireless connection with an interface of a different communication device of the communication system 3300. The host computer 3310 further comprises processing circuitry 3318, which may have storage and/or processing capabilities. In particular, the processing circuitry 3318 may comprise one or more programmable processors, application-specific integrated circuits, field programmable gate arrays or combinations of these (not shown) adapted to execute instructions. The host computer 3310 further comprises software 3311, which is stored in or accessible by the host computer 3310 and executable by the processing circuitry 3318. The software 3311 includes a host application 3312. The host application 3312 may be operable to provide a service to a remote user, such as a UE 3330 connecting via an OTT connection 3350 terminating at the UE 3330 and the host computer 3310. In providing the service to the remote user, the host application 3312 may provide user data which is transmitted using the OTT connection 3350.

The communication system 3300 further includes a base station 3320 provided in a telecommunication system and comprising hardware 3325 enabling it to communicate with the host computer 3310 and with the UE 3330. The hardware 3325 may include a communication interface 3326 for setting up and maintaining a wired or wireless connection with an interface of a different communication device of the communication system 3300, as well as a radio interface 3327 for setting up and maintaining at least a wireless connection 3370 with a UE 3330 located in a coverage area (not shown in FIG. 7) served by the base station 3320. The communication interface 3326 may be configured to facilitate a connection 3360 to the host computer 3310. The connection 3360 may be direct or it may pass through a core network (not shown in FIG. 7) of the telecommunication system and/or through one or more intermediate networks outside the telecommunication system. In the embodiment shown, the hardware 3325 of the base station 3320 further includes processing circuitry 3328, which may comprise one or more programmable processors, application-specific integrated circuits, field programmable gate arrays or combinations of these (not shown) adapted to execute instructions. The base station 3320 further has software 3321 stored internally or accessible via an external connection.

The communication system 3300 further includes the UE 3330 already referred to. Its hardware 3335 may include a radio interface 3337 configured to set up and maintain a wireless connection 3370 with a base station serving a coverage area in which the UE 3330 is currently located. The hardware 3335 of the UE 3330 further includes processing circuitry 3338, which may comprise one or more programmable processors, application-specific integrated circuits, field programmable gate arrays or combinations of these (not shown) adapted to execute instructions. The UE 3330 further comprises software 3331, which is stored in or accessible by the UE 3330 and executable by the processing circuitry 3338. The software 3331 includes a client application 3332. The client application 3332 may be operable to provide a service to a human or non-human user via the UE 3330, with the support of the host computer 3310. In the host computer 3310, an executing host application 3312 may communicate with the executing client application 3332 via the OTT connection 3350 terminating at the UE 3330 and the host computer 3310. In providing the service to the user, the client application 3332 may receive request data from the host application 3312 and provide user data in response to the request data. The OTT connection 3350 may transfer both the request data and the user data. The client application 3332 may interact with the user to generate the user data that it provides.

Figure 7:
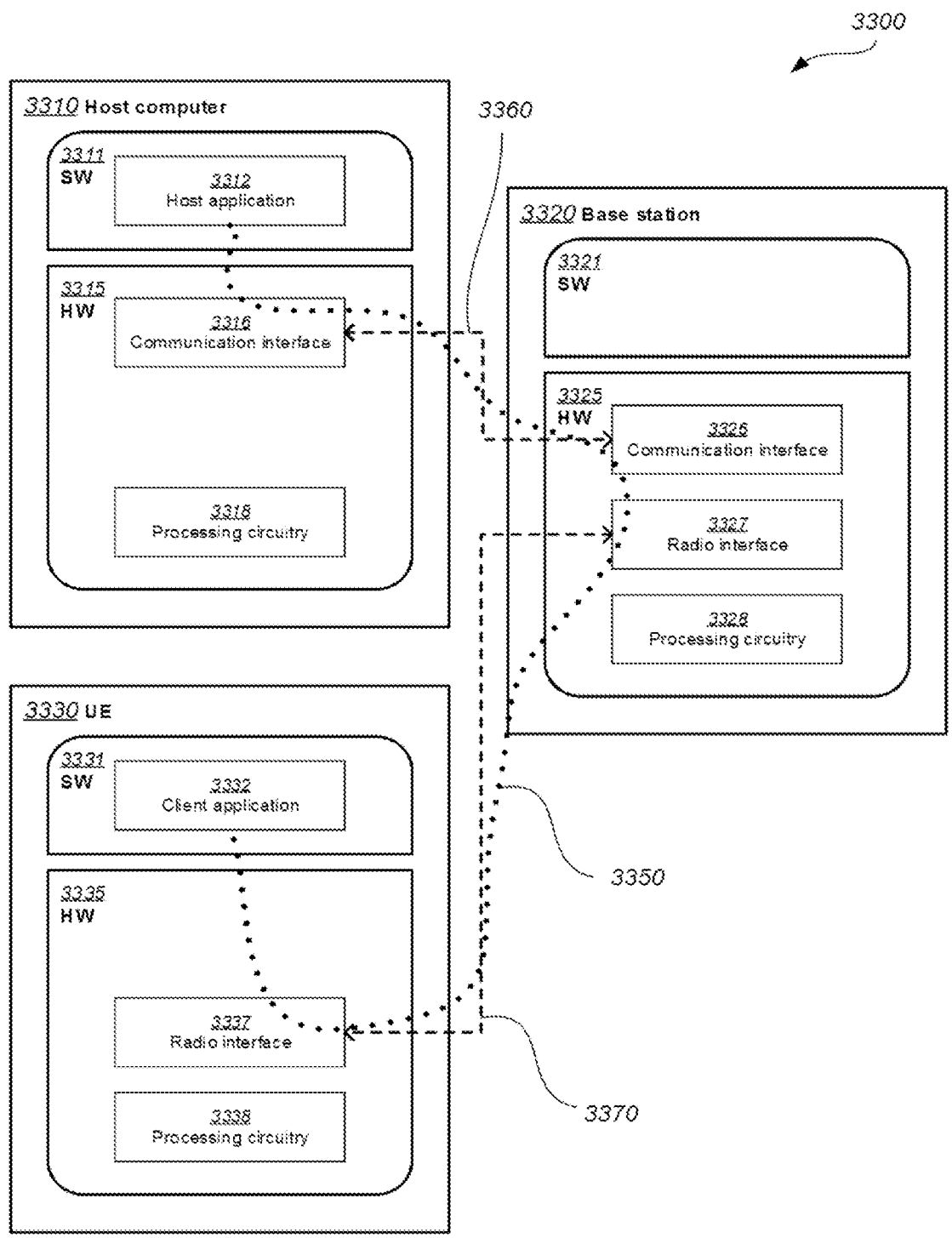
FIG. 7 is a generalized block diagram of a host computer communicating via a base station with a user equipment over a partially wireless connection.

It is noted that the host computer 3310, base station 3320 and UE 3330 illustrated in FIG. 7 may be identical to the host computer 3230, one of the base stations 3212a, 3212b, 3212c and one of the UEs 3291, 3292 of FIG. 6, respectively. This is to say, the inner workings of these entities may be as shown in FIG. 7 and independently, the surrounding network topology may be that of FIG. 6.

In FIG. 7, the OTT connection 3350 has been drawn abstractly to illustrate the communication between the host computer 3310 and the use equipment 3330 via the base station 3320, without explicit reference to any intermediary devices and the precise routing of messages via these devices. Network infrastructure may determine the routing, which it may be configured to hide from the UE 3330 or from the service provider operating the host computer 3310, or both. While the OTT connection 3350 is active, the network infrastructure may further take decisions by which it dynamically changes the routing (e.g., on the basis of load balancing consideration or reconfiguration of the network).

The wireless connection 3370 between the UE 3330 and the base station 3320 is in accordance with the teachings of the embodiments described throughout this disclosure. One or more of the various embodiments improve the performance of OTT services provided to the UE 3330 using the OTT connection 3350, in which the wireless connection 3370 forms the last segment. More precisely, the teachings of these embodiments may improve the data rate, latency, power consumption and thereby provide benefits such as user waiting time, relaxed restriction on file size, better responsiveness, extended battery lifetime.

A measurement procedure may be provided for the purpose of monitoring data rate, latency and other factors on which the one or more embodiments improve. There may further be an optional network functionality for reconfiguring the OTT connection 3350 between the host computer 3310 and UE 3330, in response to variations in the measurement results. The measurement procedure and/or the network functionality for reconfiguring the OTT connection 3350 may be implemented in the software 3311 of the host computer 3310 or in the software 3331 of the UE 3330, or both. In embodiments, sensors (not shown) may be deployed in or in association with communication devices through which the OTT connection 3350 passes; the sensors may participate in the measurement procedure by supplying values of the monitored quantities exemplified above, or supplying values of other physical quantities from which software 3311, 3331 may compute or estimate the monitored quantities. The reconfiguring of the OTT connection 3350 may include message format, retransmission settings, preferred routing etc.; the reconfiguring need not affect the base station 3320, and it may be unknown or imperceptible to the base station 3320. Such procedures and functionalities may be known and practiced in the art. In certain embodiments, measurements may involve proprietary UE signaling facilitating the host computer's 3310 measurements of throughput, propagation times, latency and the like. The measurements may be implemented in that the software 3311, 3331 causes messages to be transmitted, in particular empty or 'dummy' messages, using the OTT connection 3350 while it monitors propagation times, errors etc.

FIG. 8 is a flowchart illustrating a method implemented in a communication system, in accordance with one embodiment. The communication system includes a host computer, a base station such as a AP STA, and a UE such as a Non-AP STA which may be those described with reference to FIGS. 32 and 33. For simplicity of the present disclosure, only drawing references to FIG. 8 will be included in this section. In a first action 3410 of the method, the host computer provides user data. In an optional subaction 3411 of the first action 3410, the host computer provides the user data by executing a host application. In a second action 3420, the host computer initiates a transmission carrying the user data to the UE. In an optional third action 3430, the base station transmits to the UE the user data which was carried in the transmission that the host computer initiated, in accordance with the teachings of the embodiments described throughout this disclosure. In an optional fourth action 3440, the UE executes a client application associated with the host application executed by the host computer.

FIG. 9 is a flowchart illustrating a method implemented in a communication system, in accordance with one embodiment. The communication system includes a host computer, a base station such as a AP STA, and a UE such as a Non-AP STA which may be those described with reference to FIGS. 32 and 33. For simplicity of the present disclosure, only drawing references to FIG. 9 will be included in this section. In a first action 3510 of the method, the host computer provides user data. In an optional subaction (not shown) the host computer provides the user data by executing a host application. In a second action 3520, the host computer initiates a transmission carrying the user data to the UE. The transmission may pass via the base station, in accordance with the teachings of the embodiments described throughout this disclosure. In an optional third action 3530, the UE receives the user data carried in the transmission.

FIG. 10 is a flowchart illustrating a method implemented in a communication system, in accordance with one embodiment. The communication system includes a host computer, a base station such as a AP STA, and a UE such as a Non-AP STA which may be those described with reference to FIGS. 32 and 33. For simplicity of the present disclosure, only drawing references to FIG. 10 will be included in this section. In an optional first action 3610 of the method, the UE receives input data provided by the host computer. Additionally or alternatively, in an optional second action 3620, the UE provides user data. In an optional subaction 3621 of the second action 3620, the UE provides the user data by executing a client application. In a further optional subaction 3611 of the first action 3610, the UE executes a client application which provides the user data in reaction to the received input data provided by the host computer. In providing the user data, the executed client application may further consider user input received from the user. Regardless of the specific manner in which the user data was provided, the UE initiates, in an optional third subaction 3630, transmission of the user data to the host computer. In a fourth action 3640 of the method, the host computer receives the user data transmitted from the UE, in accordance with the teachings of the embodiments described throughout this disclosure.

FIG. 11 is a flowchart illustrating a method implemented in a communication system, in accordance with one embodiment. The communication system includes a host computer, a base station such as a AP STA, and a UE such as a Non-AP STA which may be those described with reference to FIGS. 32 and 33. For simplicity of the present disclosure, only drawing references to FIG. 11 will be included in this section. In an optional first action 3710 of the method, in accordance with the teachings of the embodiments described throughout this disclosure, the base station receives user data from the UE. In an optional second action 3720, the base station initiates transmission of the received user data to the host computer. In a third action 3730, the host computer receives the user data carried in the transmission initiated by the base station.

When using the word "comprise" or "comprising" it shall be interpreted as non-limiting, i.e. meaning "consist at least of".

The embodiments herein are not limited to the above described preferred embodiments. Various alternatives, modifications and equivalents may be used.

The invention claimed is:

1. A method performed by a network node for deciding whether or not to trigger short Semi Persistent Scheduling, SPS, reactivation of a short SPS activated User Equipment, UE, in a wireless communication network, the method comprising:
receiving Uplink, UL, data from the UE, over a radio resource, which radio resource comprises any one of: an SPS resource and a dynamically granted resource;
determining a difference of signal quality of the radio resource used for the received UL data compared to a previous signal quality calculated when last of any one of: deactivation and reactivation of short SPS was triggered;
deciding whether or not to trigger short SPS reactivation of the UE based on the determined difference of the signal quality; and
determining whether or not a latency factor is larger than a predetermined gain factor, wherein the latency factor comprises the time to empty a target buffer with the SPS resource using the result of the performed SPS TFS.

2. The method according to claim 1, further comprising: when the signal quality of the radio resource used for the received UL data is higher than the previous signal quality calculated when last of any one of: deactivation and reactivation of short SPS was triggered, performing a SPS Transmission Format Selection, TFS.

3. The method according to claim 2, further comprising: wherein the SPS TFS is performed when further, a time period between the UL data was received and the last of any one of: deactivation and reactivation of short SPS was triggered, is longer than a threshold.

4. The method according to claim 2, further comprising:
determining whether or not the performed SPS TFS resulted in a Transmission Format, TF, that was different from the TF used in the last of any one of: deactivation and reactivation of short SPS; and
when the TF is different, deciding to trigger reactivation of short SPS for the UE, and
when the TF is not different, deciding to not trigger reactivation of short SPS for the UE.

5. The method according to claim 4, wherein deciding to trigger reactivation of short SPS for the UE comprises deciding to trigger reactivation of short SPS for the UE with low priority, wherein the low priority comprises deciding to send the SPS reactivation to the UE only when there are spare control channel resources available.

6. The method according to claim 1, further comprising:
when the signal quality of the radio resource used for the received UL data is lower than the previous signal quality calculated when last of any one of: deactivation and reactivation of short SPS was triggered, performing a SPS TFS.

7. The method according to claim 1, further comprising:
when the latency factor is not larger than a predetermined gain factor, determining whether or not the performed SPS TFS resulted in a Transmission Format, TF, that was different from the TF used in the last of any one of: deactivation and reactivation of short SPS, and
when the TF is different, deciding to trigger reactivation of short SPS for the UE, and
when the TF is not different, deciding to not trigger reactivation of short SPS for the UE.

8. The method according to claim 7, wherein deciding to trigger reactivation of short SPS for the UE, comprises deciding to trigger reactivation of short SPS for the UE with high priority, wherein the high priority comprises deciding to send a control channel grant for the SPS reactivation to the UE as soon as possible.

9. The method according to claim 8, further comprising:
when the latency factor is larger than the predetermined gain factor, deciding to not trigger reactivation of short SPS for the UE, and trigger deactivation of short SPS for the UE.

10. The method according to claim 1, further comprising:
when there is no difference between the signal quality of the radio resource used for the received UL data and the previous signal quality calculated when last of any one of: deactivation and reactivation of short SPS was triggered, deciding to not trigger reactivation of short SPS for the UE.

11. A computer program product comprising a non-transitory computer readable medium storing a computer program comprising instructions, which when executed by a processor, cause the processor to perform actions according to claim 1.

12. A network node for deciding whether or not to trigger short Semi Persistent Scheduling, SPS, reactivation of a short SPS activated User Equipment, UE, in a wireless communication network, the network node being configured to:
receive, to a memory and a processor, Uplink, UL, data from the UE, over a radio resource, which radio resource is adapted to comprise any one of: an SPS resource and a dynamically granted resource;
determine, using the memory and the processor, a difference of signal quality of the radio resource used for the received UL data compared to a previous signal quality calculated when last of any one of: deactivation and reactivation of short SPS was triggered;
decide, using the memory and the processor, whether or not to trigger short SPS reactivation of the UE based on the determined difference of the signal quality; and
determine whether or not a latency factor is larger than a predetermined gain factor, wherein the latency factor comprises the time to empty a target buffer with the SPS resource using the result of the performed SPS TFS.

13. The network node according to claim 12, further being configured to:
when the signal quality of the radio resource used for the received UL data is higher than the previous signal quality calculated when last of any one of: deactivation and reactivation of short SPS was triggered, perform a SPS Transmission Format Selection, TFS.

14. The network node according to claim 13, further being configured to:
perform the SPS TFS when further a time period between the UL data was received and the last of any one of: deactivation and reactivation of short SPS was triggered, is longer than a threshold.

15. The network node according to claim 13, further being configured to:
- determine whether or not the performed SPS TFS resulted in a Transmission Format, TF, that was different from the TF used in the last of any one of: deactivation and reactivation of short SPS, and
- when the TF is different, decide to trigger reactivation of short SPS for the UE, and
- when the TF is not different, decide to not trigger reactivation of short SPS for the UE.

16. The network node according to claim 15, further being configured to decide to trigger reactivation of short SPS for the UE by deciding to trigger reactivation of short SPS for the UE with low priority, wherein the low priority is adapted to comprise deciding to send the SPS reactivation to the UE only when there are spare control channel resources available.

17. The network node according to claim 12, further being configured to:
- when the signal quality of the radio resource used for the received UL data is lower than the previous signal quality calculated when last of any one of: deactivation and reactivation of short SPS was triggered, perform a SPS TFS.

18. The network node according to claim 12, further being configured to:
- determine whether or not a latency factor is larger than a predetermined gain factor, wherein latency factor is adapted to comprise the time to empty a target buffer with the SPS resource using the result of the performed SPS TFS.

19. The network node according to claim 18, further being configured to:
- when the latency factor is not larger than a predetermined gain factor, determine whether or not the performed SPS TFS resulted in a Transmission Format, TF, that was different from the TF used in the last of any one of: deactivation and reactivation of short SPS, and
- when the TF is different, decide to trigger reactivation of short SPS for the UE, and when the TF is not different, decide to not trigger reactivation of short SPS for the UE.

20. The network node according to claim 19, further being configured to decide to trigger reactivation of short SPS for the UE, by deciding to trigger reactivation of short SPS for the UE with high priority, wherein the high priority is adapted to comprise deciding to send a control channel grant for the SPS reactivation to the UE as soon as possible.

21. The network node according to claim 18, further being configured to:
- when the latency factor is larger than the predetermined gain factor, decide to not trigger reactivation of short SPS for the UE, and trigger deactivation of short SPS for the UE.

22. The network node according to claim 12, further being configured to: when there is no difference between the signal quality of the radio resource used for the received UL data and the previous signal quality calculated when last of any one of: deactivation and reactivation of short SPS was triggered, decide to not trigger reactivation of short SPS for the UE.

* * * * *